Dec. 8, 1959 H. GRÜBER ET AL 2,916,536
VACUUM ARC FURNACE
Filed Jan. 13, 1958
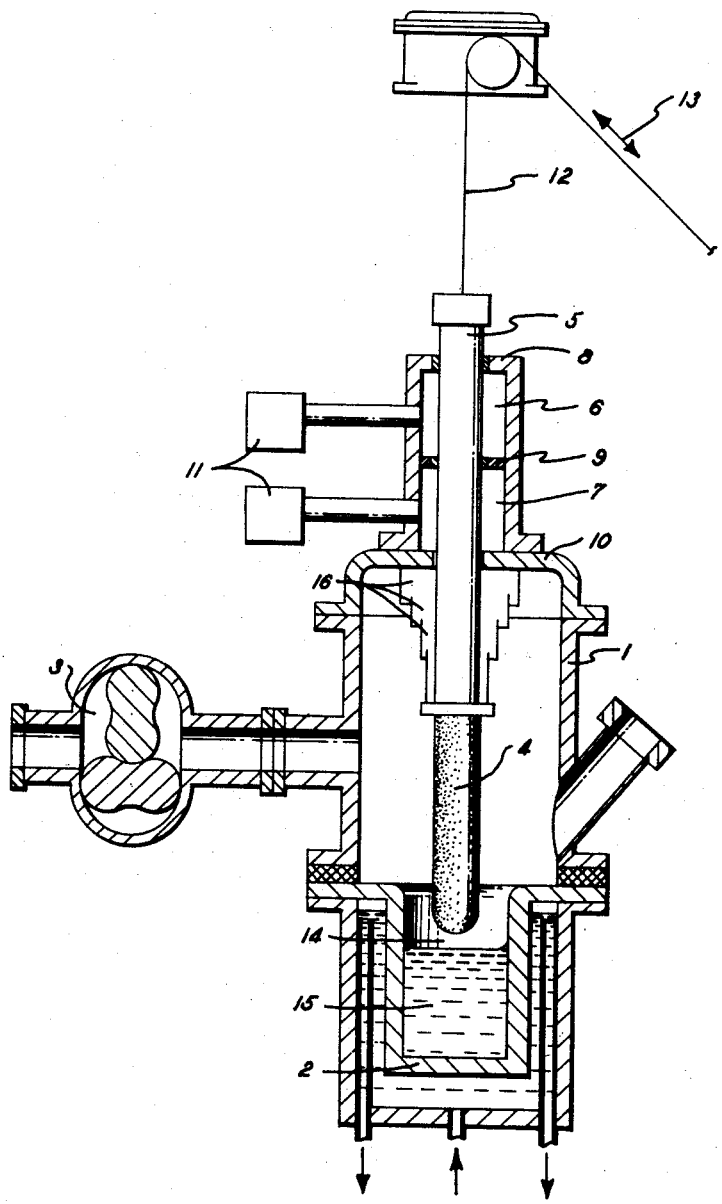
INVENTORS
HELMUT GRUBER
HELMUT SCHEIDIG
BY
Christie Parker & Hale
ATTORNEYS United States Patent Office 2,916,536
Patented Dec. 8, 1959

2,916,536

VACUUM ARC FURNACE

Helmut Grüber and Helmut Scheidig, Hanau (Main), Germany, assignors to W. C. Heraeus G.m.b.H., Hanau (Main), Germany, a corporation of Germany Application January 13, 1958, Serial No. 708,577

Claims priority, application Germany March 6, 1957

2 Claims. (Cl. 13—31)

The present invention relates to new improvements in vacuum arc furnaces.

For melting many kinds of metals which have a high melting point or are very sensitive to oxidizing or oxygen-containing gases, it has in recent years become more and more customary to use electric arc furnaces which operate under a vacuum. In each instance, such a furnace contains an electrode which is adapted to melt the metal at the high temperature of an electric arc. Such electrodes are either of the nonconsumable or permanent type consisting of tungsten or other metals which usually are water-cooled, or of the consumable type. In the latter case, the material of the electrode itself melts so as eventually to form the ingot. In both cases, the electrodes are adjustably mounted by means of a feed rod so as either to compensate for a rise in molten material in the crucible when a permanent-type of electrode is used or for feeding the consumable-type of electrode so as to supply the material to be melted at the proper rate of speed. All of these known methods, however, have in common that it is very difficult to seal the duct through which the adjustable feed rod carrying the electrode leads from the outside into the vacuum furnace and to maintain the vacuum therein. Since, generally speaking, it is much easier to seal sliding surfaces than rotary surfaces relative to each other, only slide joints with suitable packings have so far been used in actual practice.

It is an object of the present invention to overcome these difficulties of providing a proper vacuum seal in a very simple manner by inserting the feed rod carrying the electrode into the vacuum chamber of a vacuum arc furnace by passing the same through one or more intermediate pressure stages.

Such pressure stages have the great advantage that it no longer absolutely requires the slide joints to have contact surfaces which are in direct slide contact with each other. Such contact surfaces can be sealed hermetically only with great difficulty particularly because the sliding movement is directed toward the inside of the vacuum chamber whereby the lips of the sealing gaskets may be easily damaged and will then no longer form an adequate seal of the vacuum chamber. The application of one or more pressure stages according to the invention also has the advantage that the clearance between the walls of the pressure chambers and the feed rod of the electrode renders any small unevennesses on the feed rod to be of no consequence since they would only increase or decrease the distance between the sealing walls and the feed rod itself.

Also, in the operation of a vacuum arc furnace it occurs occasionally despite the greatest care that small quantities of molten metal will be splashed upwardly and adhere on the feed rod. With tightly sealing slide joints, this would mean that these small metal projections on the feed rod would seriously damage the lips of the sealing gaskets. When using intermediate pressure stages, however, such damage to the gaskets will play a minor role.

Furthermore, it is possible according to the invention to provide certain precautionary means to prevent the adherence of such small metal portions on the feed rod. These means may, for example, consist of a telescopically extendable device which protects the feed rod itself from such sprayed metal particles as long as it is located within the vacuum chamber. Such telescopic device has proved very successful also when applied to vacuum arc furnaces with slide joints of known designs and without intermediate pressure stages as provided according to the invention, since it protects the feed rod itself from being soiled. It is also of great advantage when applied to an arc furnace with pressure stages and has proved very reliable even in a continuous operation.

Further objects, features, and advantages of the present invention will appear from the following detailed description of a preferred embodiment thereof, particularly when read with reference to the accompanying drawing which illustrates a vacuum arc furnace according to the invention diagrammatically and largely in cross section. This furnace consists of a bell-shaped container 1 forming the actual vacuum chamber which is mounted above a water-cooled crucible 2 and may be evacuated by a pump unit 3. At its upper end, the electrode 4 is connected to and supported by a feed rod 5 which passes through a group of two pressure stages 6 and 7 toward the outside. These pressure stages consist of two vacuum chambers 6 and 7 with an intermediate partition 9 and inner and outer end walls 8 and 10, the inner openings of which are slightly larger than the diameter of feed rod 5. Chambers 6 and 7 are preferably evacuated by separate vacuum pump units 11.

Feed rod 5 itself is suspended on a chain 12 which may be moved in either direction as shown by arrow 13 by suitable means known as such so as to raise or lower the electrode 4 either for enlarging or reducing the electric arc 14 or for lifting the electrode in accordance with the growth of the molten charge 15 in crucible 2.

The provision of pressure stages 6 and 7 results in a drop in pressure from that of the outer atmosphere to that in the first chamber 6, in another drop in pressure from the latter to the second chamber 7, and still in another drop from the latter to the inside of the bell-shaped main chamber 1. It is thus possible by means of pump units 11 to evacuate the air entering from the outside through leaks to such an extent that whatever air might still be able to enter into the actual melting chamber will be so insignificant as to be of no further consequence and be no greater and generally considerably smaller, than the amount of gases which are freed during the melting process. On the inner side of the inner end wall 10, a telescopic spray protector is mounted which consists of three telescopically interengaging tubes 16 which cover the entire part of feed rod 5 within the main vacuum chamber 1 and are adapted to receive any small molten metal portions which might be splashed upwardly during the melting process to prevent them from landing on the feed rod 5 itself. The feed rod will therefore remain absolutely clean and the metal particles will not enter the pressure stages.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A vacuum arc furnace comprising a main chamber having an opening, at least one auxiliary chamber superimposed upon said main chamber, a feed rod extending from the outside through said auxiliary chamber and through said opening in said main chamber, an electrode within said main chamber and secured to the inner end of said feed rod, means for evacuating said chambers, means for sliding said feed rod within said chambers for raising and lowering said electrode, and a plurality of tubes telescopically slidable within each other and mounted within said main vacuum chamber near said opening for covering the lower part of said feed rod within said main chamber to protect the feed rod from any metal particles splashed upwardly during the melting process within said main chamber.

2. A vacuum arc furnace comprising a main chamber having an opening, a feed rod extending from the outside through said opening in the main chamber, an electrode within said main chamber and secured to the inner end of said feed rod, means for evacuating the main chamber, means for sliding said feed rod within said main chamber for raising and lowering the electrode, and a plurality of tubes telescopically slidable within each other and mounted within said main vacuum chamber near said opening for covering the lower part of said feed rod within said main chamber to protect the feed rod from any metal particles splashed upwardly during the melting process within said main chamber.

References Cited in the file of this patent

UNITED STATES PATENTS

| | | |
|---|---|---|
| 2,686,822 | Evans et al. | Aug. 17, 1954 |
| 2,697,126 | Herres | Dec. 14, 1954 |
| 2,726,278 | Southern | Dec. 6, 1955 |
| 2,727,936 | Boyer | Dec. 20, 1955 |
| 2,759,034 | Southern | Aug. 14, 1956 |
| 2,818,461 | Grüber et al. | Dec. 31, 1957 |
| 2,845,293 | Peckham | July 29, 1958 |